US012803061B2

(12) United States Patent
Hiratsuka

(10) Patent No.: US 12,803,061 B2
(45) Date of Patent: Nov. 17, 2026

(54) SECONDARY BATTERY

(71) Applicant: MURATA MANUFACTURING CO., LTD., Kyoto (JP)

(72) Inventor: Toshihiro Hiratsuka, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 442 days.

(21) Appl. No.: 18/582,255

(22) Filed: Feb. 20, 2024

(65) Prior Publication Data

US 2024/0222709 A1 Jul. 4, 2024

Related U.S. Application Data

(63) Continuation of application No. PCT/JP2022/034381, filed on Sep. 14, 2022.

(30) Foreign Application Priority Data

Oct. 11, 2021 (JP) ................................ 2021-167066

(51) Int. Cl.
*H01M 10/0587* (2010.01)
*H01M 4/13* (2010.01)
(Continued)

(52) U.S. Cl.
CPC ......... *H01M 10/0587* (2013.01); *H01M 4/13* (2013.01); *H01M 10/0525* (2013.01); (Continued)

(58) Field of Classification Search
None
See application file for complete search history.

(56) References Cited

U.S. PATENT DOCUMENTS

2018/0287215 A1 10/2018 Matsui et al.
2019/0198935 A1* 6/2019 Sasaki .................. H01M 4/525
2020/0106136 A1 4/2020 Yogo et al.

FOREIGN PATENT DOCUMENTS

JP 2010027415 A 2/2010
JP 2017111878 A 6/2017
(Continued)

OTHER PUBLICATIONS

International Search Report of corresponding PCT application PCT/JP2022/034381, dated Nov. 22, 2022.

*Primary Examiner* — Wyatt P Mcconnell
(74) *Attorney, Agent, or Firm* — K&L Gates LLP

(57) ABSTRACT

A secondary battery includes a battery device in which a positive electrode and a negative electrode are stacked on each other with a separator interposed between the positive electrode and the negative electrode and a stack of the positive electrode, the negative electrode, and the separator is wound about a winding axis. A section of the battery device has an elongated shape defined by a major axis and a minor axis. The section intersects the winding axis. The battery device includes a flat region and a curved region. The flat region extends in a direction of the major axis. The curved region is coupled to the flat region and is curved. The positive electrode includes a positive electrode current collector and a positive electrode active material layer. The positive electrode active material layer is provided on the positive electrode current collector. The negative electrode includes a negative electrode current collector and a negative electrode active material layer. The negative electrode active material layer is provided on the negative electrode current collector and opposed to the positive electrode active material layer. At least the positive electrode active material layer in an innermost wind of the positive electrode of the battery device includes a first part and a second part. The (Continued)

first part includes a positive electrode active material having a first area density. The second part includes a positive electrode active material having a second area density that is lower than the first area density. The second part is provided at least on both a whole of the positive electrode active material layer in the innermost wind in the curved region and the positive electrode active material layer in the innermost wind in a portion, of the flat region, that is in a vicinity of a border between the flat region and the curved region.

8 Claims, 8 Drawing Sheets

(51) Int. Cl.
*H01M 10/0525* (2010.01)
*H01M 4/02* (2006.01)

(52) U.S. Cl.
CPC ................ *H01M 2004/021* (2013.01); *H01M 2004/027* (2013.01); *H01M 2004/028* (2013.01)

(56) References Cited

FOREIGN PATENT DOCUMENTS

| | | | |
|---|---|---|---|
| JP | 2020057458 | A | 4/2020 |
| WO | 2018/042842 | A1 | 3/2018 |

* cited by examiner

SECONDARY BATTERY

CROSS REFERENCE TO RELATED APPLICATIONS

The present application is a continuation of PCT patent application no. PCT/JP2022/034381, filed on Sep. 14, 2022, which claims priority to Japanese patent application no. 2021-167066, filed on Oct. 11, 2021, the entire contents of which is incorporated herein by reference.

BACKGROUND

The present technology relates to a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode, a negative electrode, and an electrolyte that are contained inside an outer package member. A configuration of the secondary battery has been considered in various ways.

For example, a non-aqueous electrolyte secondary battery is disclosed including an elongated-shape wound electrode body having a flat part and a curved part.

SUMMARY

The present technology relates to a secondary battery.

Consideration has been given in various ways to improve performance of a secondary battery. However, there is room for improvement in terms of the performance of the secondary battery.

The present technology relates to providing a secondary battery having superior performance according to an embodiment.

A secondary battery according to an embodiment of the present technology includes a battery device in which a positive electrode and a negative electrode are stacked on each other with a separator interposed between the positive electrode and the negative electrode and a stack of the positive electrode, the negative electrode, and the separator is wound about a winding axis. A section of the battery device has an elongated shape defined by a major axis and a minor axis. The section intersects the winding axis. The battery device includes a flat region and a curved region. The flat region extends in a direction of the major axis. The curved region is coupled to the flat region and is curved. The positive electrode includes a positive electrode current collector and a positive electrode active material layer. The positive electrode active material layer is provided on the positive electrode current collector. The negative electrode includes a negative electrode current collector and a negative electrode active material layer. The negative electrode active material layer is provided on the negative electrode current collector and opposed to the positive electrode active material layer. At least the positive electrode active material layer in an innermost wind of the positive electrode of the battery device includes a first part and a second part. The first part includes a positive electrode active material having a first area density. The second part includes a positive electrode active material having a second area density that is lower than the first area density. The second part is provided at least on both a whole of the positive electrode active material layer in the innermost wind in the curved region and the positive electrode active material layer in the innermost wind in a portion, of the flat region, that is in a vicinity of a border between the flat region and the curved region.

According to the secondary battery of an embodiment of the present technology, a utilization rate of the negative electrode becomes less than or equal to 100% even in a curved region of a wound structure having an elongated shape, which makes it possible to suppress precipitation of lithium.

Note that effects of the present technology are not necessarily limited to those described herein and may include any of a series of suitable effects in relation to the present technology.

DETAILED DESCRIPTION

The present technology is described below in further detail including with reference to the drawings according to an embodiment.

A description is given first of a secondary battery according to an embodiment of the present technology.

The secondary battery to be described here is a secondary battery that obtains a battery capacity using insertion and extraction of an electrode reactant. The secondary battery includes a positive electrode, a negative electrode, and an electrolytic solution. In the secondary battery, a charge capacity of the negative electrode is greater than a discharge capacity of the positive electrode, in order to prevent the electrode reactant from being unintentionally precipitated on a surface of the negative electrode during charging. In other words, an electrochemical capacity per unit area of the negative electrode is set to be greater than an electrochemical capacity per unit area of the positive electrode.

The electrode reactant is not particularly limited in kind, and specific examples thereof include a light metal such as an alkali metal or an alkaline earth metal. Examples of the alkali metal include lithium, sodium, and potassium. Examples of the alkaline earth metal include beryllium, magnesium, and calcium.

Hereinafter, examples are given of a case where the electrode reactant is lithium. A secondary battery that obtains a battery capacity using insertion and extraction of lithium is what is called a lithium-ion secondary battery. In the lithium-ion secondary battery, lithium is inserted and extracted in an ionic state.

Figure 1:
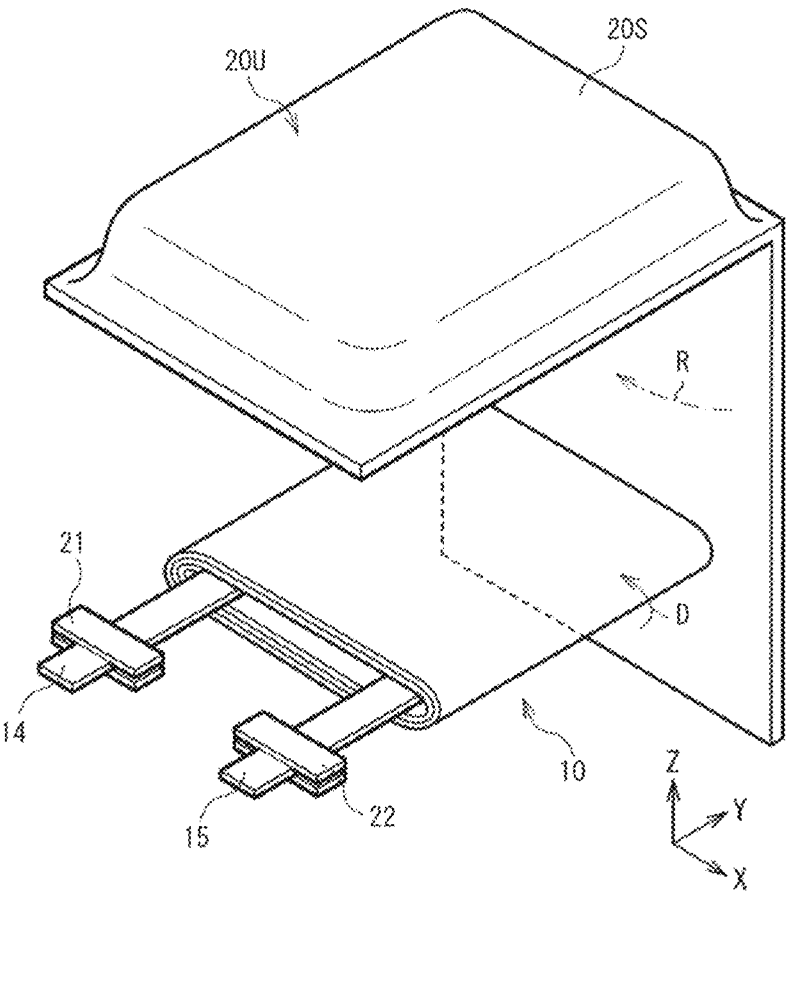
FIG. 1 is a perspective view of a configuration of a secondary battery according to an embodiment of the present technology.
Figure 2:
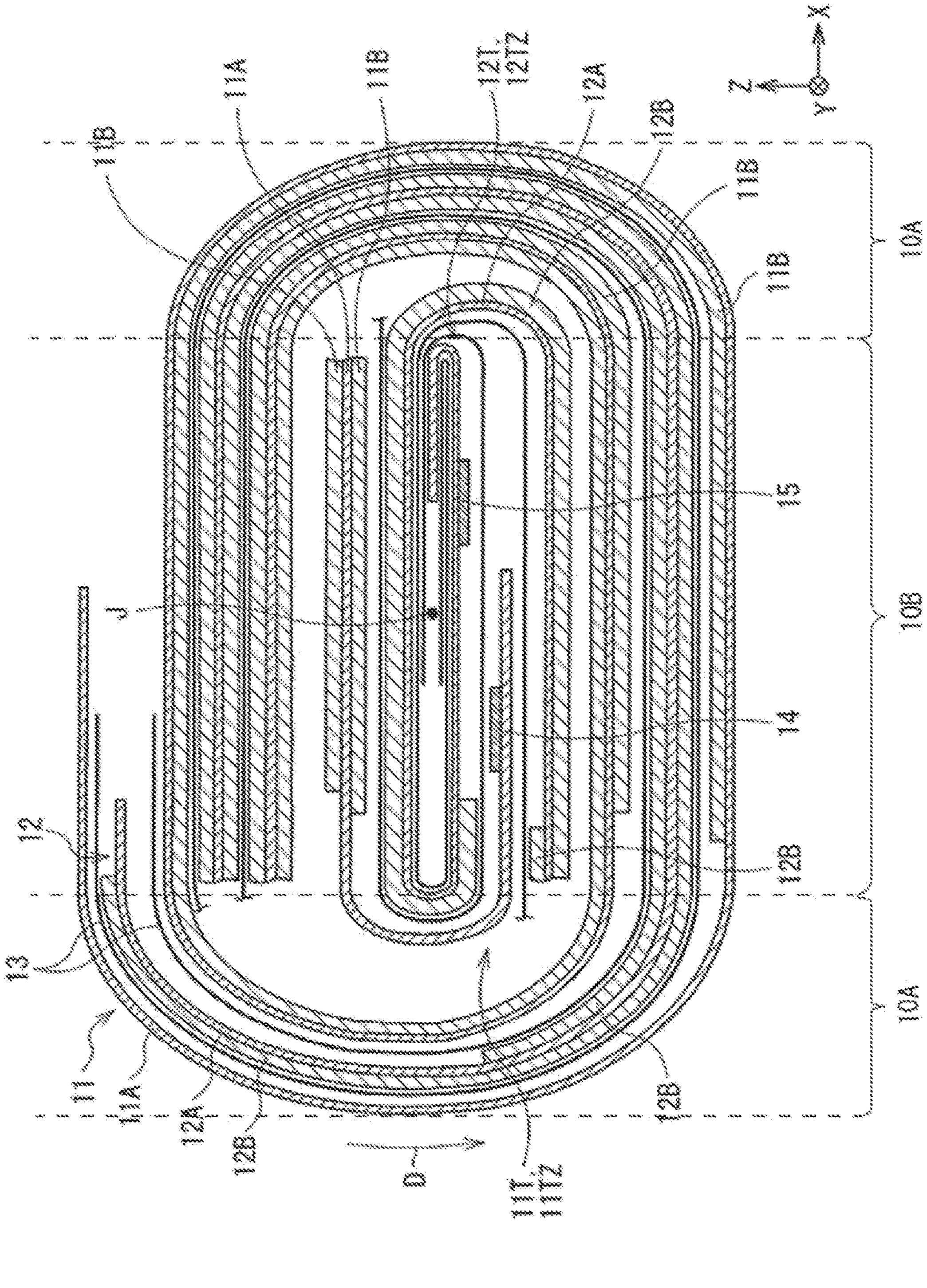
FIG. 2 is a sectional view of the configuration of the secondary battery illustrated in FIG. 1.
Figure 3:
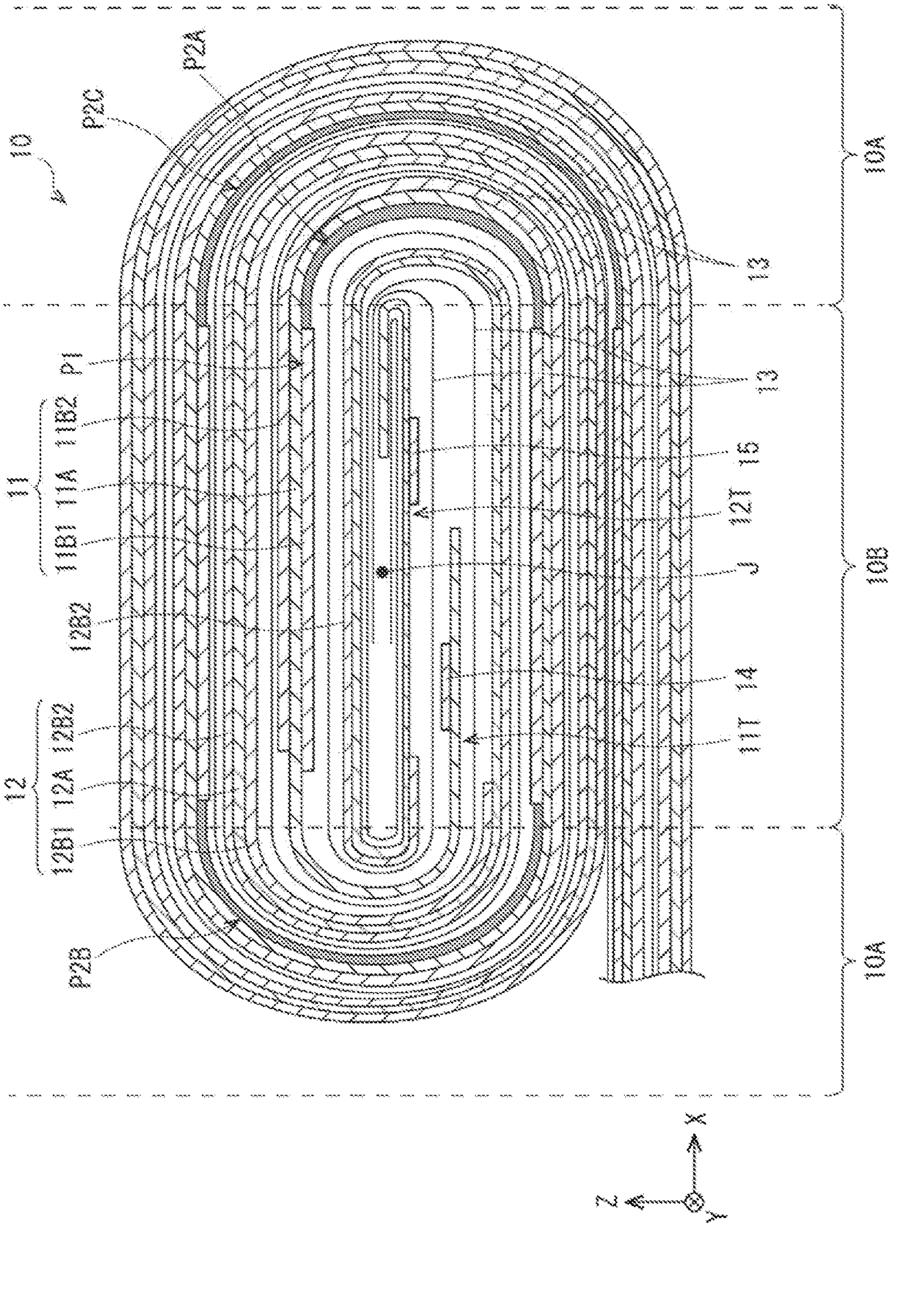
FIG. 3 is a sectional view of a configuration of a periphery of a winding axis of a battery device illustrated in FIG. 2.
Figure 4:
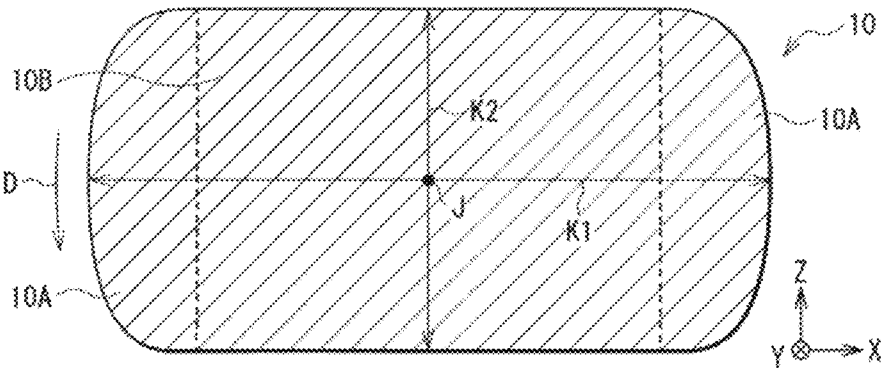
FIG. 4 is another sectional view, schematically illustrated, of a configuration of the battery device illustrated in FIG. 1.
Figure 5:
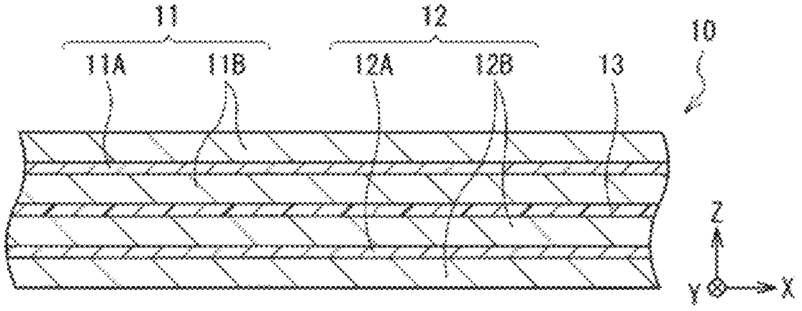
FIG. 5 is an enlarged sectional view of a configuration of a portion of the battery device illustrated in FIG. 2.
Figure 6:
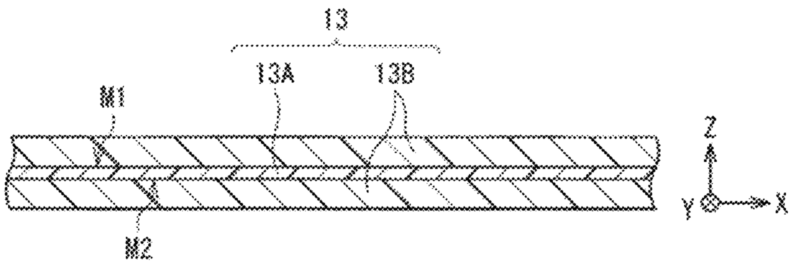
FIG. 6 is an enlarged sectional view of a configuration of a separator illustrated in FIG. 5.

FIG. 1 illustrates a perspective configuration of the secondary battery according to an embodiment including a battery device 10. FIG. 2 illustrates a sectional configuration of the battery device 10 illustrated in FIG. 1. FIG. 3 is an enlarged sectional view of a periphery of a winding axis J of the battery device 10 illustrated in FIG. 2. FIG. 4 schematically illustrates a shape of a section of the battery device 10 illustrated in FIG. 1. FIG. 5 is an enlarged sectional view of a configuration of a portion of the battery device 10 illustrated in FIG. 2. FIG. 6 is an enlarged sectional view of a configuration of a separator 13 illustrated in FIG. 5. FIG. 1 illustrates a state in which the battery device 10 and an outer package film 20 are separated from each other. FIG. 4 illustrates a section of the battery device 10 intersecting the winding axis J. The winding axis J extends in a Y-axis direction.

As illustrated in FIGS. 1 to 4, the secondary battery includes the battery device 10, the outer package film 20, a positive electrode lead 14, and a negative electrode lead 15. The battery device 10 is contained inside the outer package film 20. The positive electrode lead 14 and the negative electrode lead 15 are each led out in a common direction from inside to outside the outer package film 20.

The secondary battery is a secondary battery of a laminated-film type. The secondary battery of the laminated-film type includes the outer package film 20 having flexibility or softness, as an outer package member to contain the battery device 10.

The outer package film 20 is a single film-shaped member and is foldable in a direction of an arrow R (a dash-dotted line), as illustrated in FIG. 1. The outer package film 20 contains the battery device 10. The outer package film 20 thus contains a positive electrode 11, a negative electrode 12, and the electrolytic solution. The outer package film 20 has a depression part 20U to place the battery device 10 therein. The depression part 20U is what is called a deep drawn part.

Specifically, the outer package film 20 is a three-layered laminated film including a fusion-bonding layer, a metal layer, and a surface protective layer that are stacked in this order from an inner side. In a state in which the outer package film 20 is folded, outer edge parts of the fusion-bonding layer of the outer package film 20 opposed to each other are fusion-bonded to each other. The fusion-bonding layer of the outer package film 20 includes a polymer compound such as polypropylene. The metal layer of the outer package film 20 includes a metal material such as aluminum. The surface protective layer of the outer package film 20 includes a polymer compound such as nylon.

Note that the outer package film 20 is not limited to the above-described configuration. The outer package film 20 may be single-layered or two-layered, or may include four or more layers.

A sealing film 21 is interposed between the outer package film 20 and the positive electrode lead 14. A sealing film 22 is interposed between the outer package film 20 and the negative electrode lead 15. The sealing films 21 and 22 are members that each prevent unintentional entry of outside air into the outer package film 20. The sealing film 21 includes any one or more of polymer compounds, including polyolefin, that have adherence to the positive electrode lead 14, and the sealing film 22 includes any one or more of polymer compounds, including polyolefin, that have adherence to the negative electrode lead 15. Examples of the polyolefin include polyethylene, polypropylene, modified polyethylene, and modified polypropylene. Note that the sealing film 21, the sealing film 22, or both may be omitted.

As illustrated in FIGS. 1 to 4, the battery device 10 includes the positive electrode 11, the negative electrode 12, and the separator 13. The positive electrode 11, the negative electrode 12, and the separator 13 are each impregnated with the electrolytic solution that is a liquid electrolyte.

As illustrated in FIGS. 1 to 3, the battery device 10 is a structure in which the positive electrode 11 and the negative electrode 12 are wound in a winding direction D with the separator 13 interposed therebetween, and is what is called a wound electrode body. More specifically, in the battery device 10 that is the wound electrode body, the positive electrode 11 and the negative electrode 12 are stacked on each other with the separator 13 interposed therebetween, and the stack of the positive electrode 11, the negative electrode 12, and the separator 13 is wound about the winding axis J in the winding direction D. In other words, the positive electrode 11 and the negative electrode 12 are opposed to each other with the separator 13 interposed therebetween, and are wound in the winding direction D together with the separator 13.

As illustrated in FIG. 4, a section of the battery device 10 intersecting the winding axis J, that is, a section of the battery device 10 along an XZ plane, has an elongated shape defined by a major axis K1 and a minor axis K2, and more specifically, has an elongated, generally elliptical shape. The major axis K1 is an axis (also referred to as a horizontal axis) that extends in an X-axis direction and has a relatively large length. The minor axis K2 is an axis (also referred to as a vertical axis) that extends in the Z-axis direction intersecting the X-axis direction and has a relatively small length.

In other words, the battery device 10 that is the wound electrode body has an elongated three-dimensional shape as a whole. The battery device 10 thus includes, as illustrated in FIGS. 2 and 4, a pair of curved regions 10A and a flat region 10B. The flat region 10B is located between the pair of curved regions 10A and is coupled to the pair of curved regions 10A. The curved region 10A is a region in which the positive electrode 11, the negative electrode 12, and the separator 13 are so curved as to draw a curve. In contrast, the flat region 10B is a region in which the positive electrode 11, the negative electrode 12, and the separator 13 are not curved and are substantially flat along the major axis K1. In other words, the flat region 10B is a region in which a dimension along the minor axis K2 of the battery device 10 is maximum and constant. In contrast, the curved region 10A is a region in which a dimension along the minor axis K2 of the battery device 10 is smaller than that of the flat region 10B, and the dimension along the minor axis K2 decreases as a distance from the flat region 10B increases. In each of FIGS. 2 and 4, a dashed line is given to a border between the curved region 10A and the flat region 10B.

As illustrated in FIGS. 2, 3, and 5, the positive electrode 11 includes a positive electrode current collector 11A and two positive electrode active material layers 11B provided on respective opposite surfaces of the positive electrode current collector 11A. Note, however, that the positive electrode active material layer 11B may be provided only on one of the opposite surfaces of the positive electrode current collector 11A. In FIG. 3, the positive electrode active material layer 11B provided on one of the opposite surfaces of the positive electrode current collector 11A that is located on an inner side of winding is referred to as a positive electrode active material layer 11B1, and the positive electrode active material layer 11B provided on another of the opposite surfaces of the positive electrode current collector 11A that is located on an outer side of the winding is referred to as a positive electrode active material layer 11B2. In the description herein, the positive electrode active material layer 11B1 and the positive electrode active material layer 11B2 may be collectively referred to as the positive electrode active material layers 11B.

The positive electrode current collector 11A includes any one or more of electrically conductive materials including, without limitation, a metal material. Examples of the metal material include aluminum, nickel, and stainless steel. The positive electrode active material layer 11B includes any one or more of positive electrode active materials into which lithium is insertable and from which lithium is extractable. Note that the positive electrode active material layer 11B may further include, for example, a positive electrode binder and a positive electrode conductor.

The positive electrode active material is not particularly limited in kind, and specific examples thereof include a lithium-containing compound such as a lithium-containing transition metal compound. The lithium-containing transition metal compound includes lithium and one or more transition metal elements, and may further include one or more other elements. The other elements may be any elements other than transition metal elements, and are not particularly limited in kind. Specifically, however, the other elements are elements belonging to groups 2 to 15 in the long period periodic table of elements. The lithium-containing transition metal compound is not particularly limited in kind, and specific examples thereof include an oxide, a phosphoric acid compound, a silicic acid compound, and a boric acid compound.

Specific examples of the oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, and $LiMn_2O_4$. Specific examples of the phosphoric acid compound include $LiFePO_4$, $LiMnPO_4$, $LiFe_{0.5}Mn_{0.5}PO_4$, and $LiFe_{0.3}Mn_{0.7}PO_4$.

Here, as illustrated in FIG. 2, the positive electrode active material layer 11B is provided only on a portion, of the positive electrode current collector 11A, in the middle of winding in the winding direction D. Thus, at a positive electrode end part 11T that is an end part, of the positive electrode 11, on the inner side of the winding, the positive electrode current collector 11A is not covered with the positive electrode active material layer 11B and is exposed. Further, also at an end part, of the positive electrode 11, on the outer side of the winding, the positive electrode current collector 11A is not covered with the positive electrode active material layer 11B and is exposed.

The positive electrode binder includes any one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes any one or more of electrically conductive materials including, without limitation, a carbon material. Examples of the carbon material include graphite, carbon black, acetylene black, and Ketjen black. Note that the electrically conductive material may be a metal material or a polymer compound, for example.

As illustrated in FIGS. 2, 3, and 5, the negative electrode 12 includes a negative electrode current collector 12A and two negative electrode active material layers 12B provided on respective opposite surfaces of the negative electrode current collector 12A. Note, however, that the negative electrode active material layer 12B may be provided only on one of the opposite surfaces of the negative electrode current collector 12A. In FIG. 3, the negative electrode active material layer 12B provided on one of the opposite surfaces of the negative electrode current collector 12A that is located on the inner side of the winding is referred to as a negative electrode active material layer 12B1, and the negative electrode active material layer 12B provided on another of the opposite surfaces of the negative electrode current collector 12A that is located on the outer side of the winding is referred to as a negative electrode active material layer 12B2. In the description herein, the negative electrode active material layer 12B1 and the negative electrode active material layer 12B2 may be collectively referred to as the negative electrode active material layers 12B.

The negative electrode current collector 12A includes any one or more of electrically conductive materials including, without limitation, a metal material. Examples of the metal material include copper, aluminum, nickel, and stainless steel. The negative electrode active material layer 12B includes any one or more of negative electrode active materials into which lithium is insertable and from which lithium is extractable. Note that the negative electrode active material layer 12B may further include, for example, a negative electrode binder and a negative electrode conductor. Details of the negative electrode binder are similar to those of the positive electrode binder. Details of the negative electrode conductor are similar to those of the positive electrode conductor.

The negative electrode active material is not particularly limited in kind, and specific examples thereof include a carbon material and a metal-based material. Examples of the carbon material include graphitizable carbon, non-graphitizable carbon, and graphite. Examples of the graphite include natural graphite and artificial graphite. The metal-based material is a material that includes any one or more elements among metal elements and metalloid elements that are each able to form an alloy with lithium. Examples of such metal elements and metalloid elements include silicon and tin. The metal-based material may be a simple substance, an alloy, a compound, a mixture of two or more thereof, or a material including two or more phases thereof.

Specific examples of the metal-based material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), LiSiO, $SnO_w$ ($0<w\leq2$), $SnSiO_3$, LiSnO, and $Mg_2Sn$. Note that "v" of $SiO_v$ may satisfy $0.2<v<1.4$.

A method of forming the negative electrode active material layer 12B is not particularly limited, and specifically, any one or more methods are selected from among a coating method, a vapor-phase method, a liquid-phase method, a thermal spraying method, a firing (sintering) method, and other methods.

Here, as illustrated in FIG. 2, the negative electrode active material layer 12B is provided only on a portion, of the negative electrode current collector 12A, in the middle of winding in the winding direction D. Thus, at a negative electrode end part 12T that is an end part, of the negative electrode 12, on the inner side of the winding, the negative electrode current collector 12A is not covered with the negative electrode active material layer 12B and is exposed. Further, also at an end part, of the negative electrode 12, on the outer side of the winding, the negative electrode current collector 12A is not covered with the negative electrode active material layer 12B and is exposed.

Further, a maximum utilization rate of the negative electrode 12 in a fully charged state (hereinafter, simply referred to as a "negative electrode utilization rate") is preferably greater than or equal to 90% and less than or equal to 100% when the secondary battery is charged at a battery voltage of 4.4 V. The negative electrode utilization rate is expressed by: negative electrode utilization rate (%)=positive electrode discharge capacity per unit area/negative electrode discharge capacity per unit area. Here, "per unit area" means "per area where the positive electrode 11 and the negative electrode 12 are opposed to each other". A reason for this is that it is only the opposed portion that substantially operates. If the negative electrode utilization rate is greater than or equal to 90%, an initial charge efficiency does not decrease, and it is possible to sufficiently ensure a battery capacity. Further, if the negative electrode utilization rate is less than or equal to 100%, precipitation of Li is prevented, and it is possible to ensure higher safety.

The separator 13 is an insulating porous film interposed between the positive electrode 11 and the negative electrode 12 as illustrated in FIGS. 2 and 4, and allows lithium ions to pass therethrough while preventing contact between the positive electrode 11 and the negative electrode 12. FIG. 2 illustrates the separator 13 in a linear shape for simplicity of illustration.

Here, the separator 13 has a multilayer structure including a polymer compound layer 13B to be described later. Specifically, as illustrated in FIG. 5, the separator 13 includes a porous layer 13A and two polymer compound layers 13B provided on respective opposite surfaces of the porous layer 13A. A reason for this is that adherence of the separator 13 to each of the positive electrode 11 and the negative electrode 12 improves to suppress occurrence of positional displacement of the battery device 10. This helps to prevent the secondary battery from easily swelling even if, for example, a decomposition reaction of the electrolytic solution occurs.

The porous layer 13A includes any one or more of polymer compounds including, without limitation, polytetrafluoroethylene, polypropylene, and polyethylene. The porous layer 13A has two opposed surfaces (opposed surfaces M1 and M2). The opposed surface M1 is one of the two opposed surfaces of the porous layer 13A on a side opposed to the positive electrode 11, and the opposed surface M2 is another of the two opposed surfaces of the porous layer 13A on a side opposed to the negative electrode 12. Note that the porous layer 13A may be single-layered or multiple-layered.

The polymer compound layer 13B is provided on each of the two opposed surfaces of the porous layer 13A, and is thus provided on each of the opposed surfaces M1 and M2. The polymer compound layer 13B includes a polymer compound and inorganic particles. A reason for this is that the inorganic particles dissipate heat upon heat generation by the secondary battery, and this improves heat resistance and safety of the secondary battery. Note that the polymer compound layer 13B may be single-layered or multiple-layered.

The polymer compound includes any one or more of materials including, without limitation, polyvinylidene difluoride. A reason for this is that superior physical strength is obtainable and electrochemical stability is also obtainable. The inorganic particles include any one or more of inorganic materials including, without limitation, aluminum oxide (alumina), aluminum nitride, boehmite, silicon oxide (silica), titanium oxide (titania), magnesium oxide (magnesia), and zirconium oxide (zirconia).

The separator 13 may have a single-layer structure. A configuration of the separator 13 having the single-layer structure is similar to the configuration of the porous layer 13A described above.

The electrolytic solution includes a solvent and an electrolyte salt.

The solvent includes any one or more of non-aqueous solvents (organic solvents). The electrolytic solution including a non-aqueous solvent is what is called a non-aqueous electrolytic solution. Examples of the non-aqueous solvent include esters and ethers. More specific examples of the non-aqueous solvent include a carbonic-acid-ester-based compound, a carboxylic-acid-ester-based compound, and a lactone-based compound.

Examples of the carbonic-acid-ester-based compound include a cyclic carbonic acid ester and a chain carbonic acid ester. Examples of the cyclic carbonic acid ester include ethylene carbonate and propylene carbonate. Examples of the chain carbonic acid ester include dimethyl carbonate, diethyl carbonate, and methyl ethyl carbonate. Examples of the carboxylic-acid-ester-based compound include ethyl acetate, ethyl propionate, and ethyl trimethyl acetate. Examples of the lactone-based compound include γ-butyrolactone and γ-valerolactone. Examples of the ethers other than the lactone-based compounds described above include 1,2-dimethoxyethane, tetrahydrofuran, 1,3-dioxolane, and 1,4-dioxane.

Further, examples of the non-aqueous solvent include an unsaturated cyclic carbonic acid ester, a halogenated carbonic acid ester, a sulfonic acid ester, a phosphoric acid ester, an acid anhydride, a nitrile compound, and an isocyanate compound. A reason for this is that chemical stability of the electrolytic solution improves.

Specific examples of the unsaturated cyclic carbonic acid ester include vinylene carbonate, vinylethylene carbonate, and methylene ethylene carbonate. Examples of the halogenated carbonic acid ester include monofluoroethylene carbonate and difluoroethylene carbonate. Examples of the sulfonic acid ester include 1,3-propane sultone and 1,3-propene sultone. Examples of the phosphoric acid ester include trimethyl phosphate. Examples of the acid anhydride include a cyclic carboxylic acid anhydride, a cyclic disulfonic acid anhydride, and a cyclic carboxylic acid sulfonic acid anhydride. Examples of the cyclic carboxylic acid anhydride include a succinic acid anhydride, a glutaric acid anhydride, and a maleic acid anhydride. Examples of the cyclic disulfonic acid anhydride include an ethane disulfonic acid anhydride and a propane disulfonic acid anhydride. Examples of the cyclic carboxylic acid sulfonic acid anhydride include a sulfobenzoic acid anhydride, a sulfopropionic acid anhydride, and a sulfobutyric acid anhydride. Examples of the nitrile compound include acetonitrile, acrylonitrile, malononitrile, succinonitrile, glutaronitrile, adiponitrile, sebaconitrile, and phthalonitrile. Examples of the isocyanate compound include hexamethylene diisocyanate.

The electrolyte salt includes any one or more of light metal salts including, without limitation, a lithium salt. Examples of the lithium salt include lithium hexafluorophosphate ($LiPF_6$), lithium tetrafluoroborate ($LiBF_4$), lithium trifluoromethanesulfonate ($LiCF_3SO_3$), lithium bis (fluorosulfonyl)imide ($LiN(FSO_2)_2$), lithium bis(trifluoromethanesulfonyl)imide ($LiN(CF_3SO_2)_2$), lithium tris(trifluoromethanesulfonyl)methide ($LiC(CF_3SO_2)_3$), and lithium bis(oxalato)borate ($LiB(C_2O_4)_2$). Although not particularly limited, a content of the electrolyte salt is specifically within a range from 0.3 mol/kg to 3.0 mol/kg both inclusive with respect to the solvent. A reason for this is that a high ionic conductivity is obtainable.

The positive electrode lead 14 is a positive electrode terminal coupled to the positive electrode 11, and is coupled to the positive electrode 11 on a side where the positive electrode 11 is opposed to the negative electrode 12. The positive electrode lead 14 includes any one or more of electrically conductive materials including, without limitation, aluminum. The negative electrode lead 15 is a negative electrode terminal coupled to the negative electrode 12, and is coupled to the negative electrode 12 on a side where the negative electrode 12 is opposed to the positive electrode 11. The negative electrode lead 15 includes any one or more of electrically conductive materials including, without limitation, copper, nickel, and stainless steel. The positive electrode lead 14 and the negative electrode lead 15 each have a shape such as a thin plate shape or a meshed shape.

As described above, the battery device 10 includes the pair of curved regions 10A and the flat region 10B. The positive electrode lead 14 is coupled to the positive electrode 11 in the flat region 10B. The negative electrode lead 15 is coupled to the negative electrode 12 in the flat region 10B.

Note that the negative electrode lead 15 is so disposed as to be located at a position that is not opposed to the positive electrode lead 14. In other words, the negative electrode lead 15 is so disposed as not to lie over the positive electrode lead 14 with the separator 13 interposed therebetween. A position of the positive electrode lead 14 and the position of negative electrode lead 15 are different from each other in the winding direction D, as illustrated in FIG. 2. In the example of the secondary battery illustrated in FIG. 2, the negative electrode lead 15 is located on the inner side of the winding in the winding direction D relative to the positive electrode lead 14.

The number of the positive electrode leads 14 is not particularly limited, and may be one, or two or more. The number of the negative electrode leads 15 is not particularly limited, and may be one, or two or more. If the number of the positive electrode leads 14 and the number of the negative electrode leads 15 are each two or more, in particular, the secondary battery decreases in electrical resistance.

Figure 7:
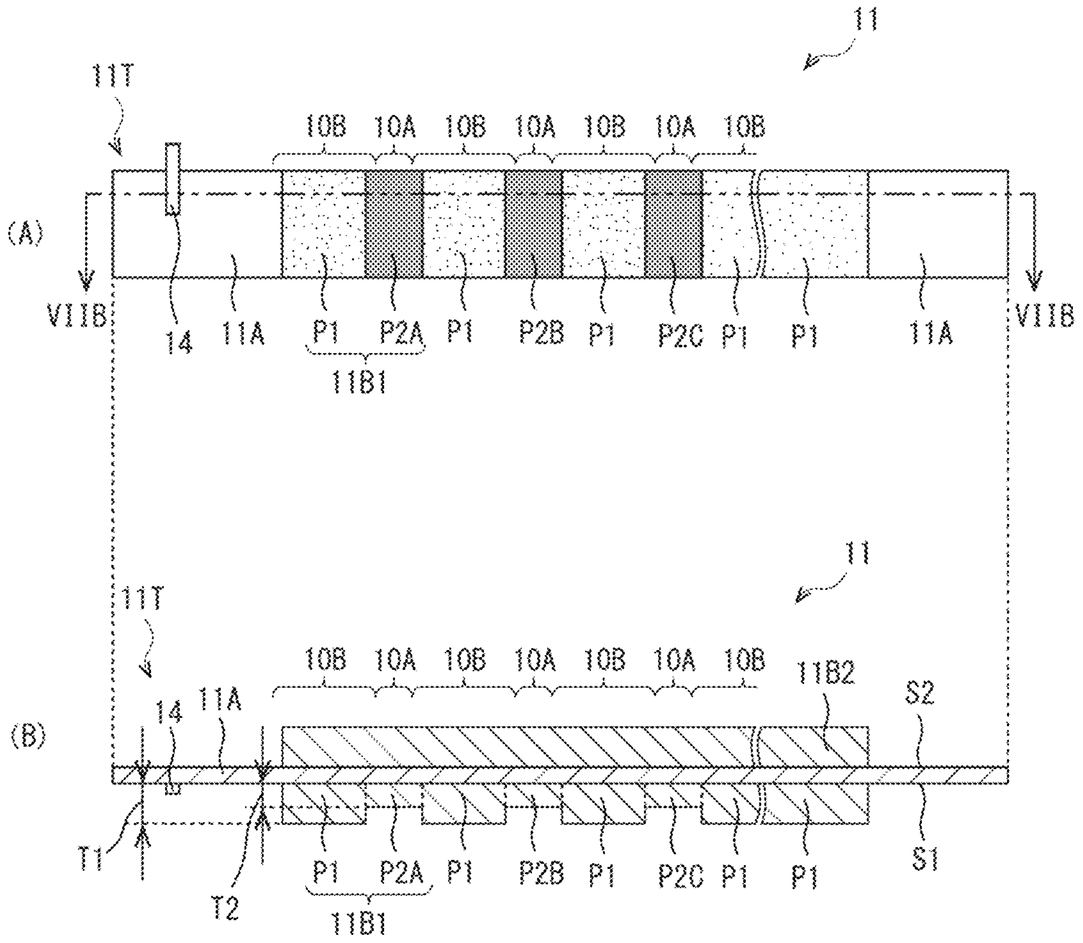
FIG. 7 includes a developed plan view and a developed sectional view of the battery device illustrated in FIG. 3.

Next, referring mainly to FIG. 3 and FIG. 7, a description is given of details of a configuration of the positive electrode 11 included in the battery device 10 having a wound structure. In FIG. 7, (A) on an upper part of a sheet plane is a developed view illustrating the battery device 10 that is a wound structural body developed in a planar shape. In (A) of FIG. 7, a state on an inner surface side of the positive electrode current collector 11A is schematically illustrated. In FIG. 7, (B) on a lower part of the sheet plane is a developed sectional view of the battery device 10 in a thickness direction, and illustrates a section along a line VIIB-VIIB in (A) of FIG. 7. In (B) of FIG. 7, the positive electrode 11 is illustrated in such a manner that an inner surface S1 of the positive electrode current collector 11A is on a lower side of the sheet plane and an outer surface S2 of the positive electrode current collector 11A is on an upper side of the sheet plane. As illustrated in FIGS. 3 and 7, in the secondary battery according to an embodiment, at least the positive electrode active material layer 11B in an innermost wind of the battery device 10 includes a first part P1 and a second part P2. In FIGS. 3 and 7, first to third second parts P2 counted from the positive electrode end part 11T on the inner side of the winding of the positive electrode 11 are denoted by reference signs P2A to P2C, respectively.

The first part P1 includes a positive electrode active material having a first area density D1. The second part P2 includes a positive electrode active material having a second area density D2 (<D1) that is lower than the first area density. The second part P2 is provided at least on both a whole of the positive electrode active material layer 11B1 in the innermost wind in the curved region 10A and the positive electrode active material layer 11B1 in the innermost wind in a portion, of the flat region 10B, that is in the vicinity of a border between the flat region 10B and the curved region 10A. Here, the area density is a weight per unit area of the positive electrode active material included in the positive electrode active material layer 11B provided on a surface of the positive electrode current collector 11A. The first area density D1 is an area density in the first part P1 of the positive electrode active material layer 11B. The second area density D2 is an area density in the second part P2 of the positive electrode active material layer 11B. The second area density D2 is preferably greater than or equal to 70% and less than or equal to 95% of the first area density D1. In other words, an area density ratio D2/D1 that is a ratio of the second area density D2 to the first area density D1 preferably satisfies the following expression.

$$0.7 \le (D2/D1) \le 0.95$$

The first area density D1 in the first part P1 is a value determined, for example, as follows. First, a battery is completely discharged and is thereafter disassembled to take out the positive electrode 11. Thereafter, the positive electrode 11 is washed with a solvent (e.g., dimethyl carbonate), following which the positive electrode 11 is sufficiently dried. Thereafter, the positive electrode active material layer 11B2 provided on the outer surface S2 of the positive electrode current collector 11A is peeled off by, for example, a fabric impregnated with a solvent (e.g., N-methyl-2-pyrrolidone). Thereafter, the solvent remaining on the outer surface S2 of the positive electrode current collector 11A is wiped with a fabric impregnated with ethanol, following which the positive electrode active material layer 11B1 is sufficiently dried at a room temperature. In this manner, the positive electrode 11 having the positive electrode active material layer 11B1 only on the inner surface S1 of the positive electrode current collector 11A is obtained. Thereafter, a portion of the positive electrode active material layer 11B1 corresponding to the first part P1 is punched together with the positive electrode current collector 11A, for example, in a circular shape having a diameter of 5 mm, and mass [mg] (hereinafter referred to as "mass A1") of the portion is measured. Thereafter, a portion of the positive electrode 21 where neither the positive electrode active material layer 11B1 nor the positive electrode active material layer 11B2 is provided and both the inner surface S1 and the outer surface S2 of the positive electrode current collector 11A are exposed is punched in a manner similar to that described above, and mass [mg] (hereinafter referred to as "mass B") of the portion is measured. Thereafter, the first area density D1 is calculated by the following expression. Note that the first area density D1 may be calculated for each of multiple (for example, 10) first parts P1, and a simple average thereof may be determined.

$$\text{First area density } D1\ [\text{mg/cm}^2] = (\text{mass } A1\ [\text{mg}] - \text{mass } B\ [\text{mg}])/(\text{punched area } [\text{cm}^2])$$

The second area density D2 in the second part P2 is a value determined, for example, as follows. A portion of the sufficiently dried positive electrode active material layer 11B1 corresponding to the second part P2 is punched, for example, in a circular shape having a diameter of 5 mm, and mass [mg] (hereinafter referred to as "mass A2") of the portion is measured. Thereafter, a portion where neither the positive electrode active material layer 11B1 nor the positive electrode active material layer 11B2 is provided and both the inner surface S1 and the outer surface S2 of the positive electrode current collector 11A are exposed is punched in a manner similar to that described above, and the mass B [mg] is measured. Thereafter, the second area density D2 is calculated by the following expression. Note that the second area density D2 may be calculated for each of multiple (for example, 10) second parts P2, and a simple average thereof may be determined.

$$\text{Second area density } D2\ [\text{mg/cm}^2] = (\text{mass } A2\ [\text{mg}] - \text{mass } B\ [\text{mg}])/(\text{punched area } [\text{cm}^2])$$

The positive electrode active material layer 11B in the innermost wind of the positive electrode 11 of the battery device 10 is located on the outer side of the winding relative to the negative electrode active material layer 12B in the innermost wind of the negative electrode 12 of the battery device 10. In the example illustrated in FIG. 3, the positive electrode active material layer 11B1 in the innermost wind is located on the outer side of the winding relative to the negative electrode active material layer 12B2 in the innermost wind, and is opposed to the negative electrode active material layer 12B2 with the separator 13 interposed therebetween. The positive electrode active material layer 11B1 in the innermost wind is provided on the inner surface side of the positive electrode current collector 11A, that is, on a side of the winding axis J.

As illustrated in FIGS. 3 and 7, the second parts P2 in the positive electrode active material layer 11B are discretely provided along a longitudinal direction of the battery device 10. In the example illustrated in FIGS. 3 and 7, in the positive electrode active material layer 11B1, respective portions of the positive electrode active material layer 11B1 provided in the curved region 10A at first to third locations counted from the positive electrode end part 11T on the inner side of the winding serve as the second parts P2 (P2A to P2C). The second parts P2A to P2C each also extend in the winding direction along a portion, of the positive electrode active material layer 11B1, that occupies the curved region 10A, that is, extend into respective portions of the flat regions 10B located adjacent to the curved region 10A in the longitudinal direction of the battery device 10.

In order to cause the first area density D1 of the positive electrode active material in the first part P1 and the second area density D2 of the positive electrode active material in the second part P2 to be different from each other, the first part P1 may have a first thickness T1 and the second part P2 may have a second thickness T2 that is smaller than the thickness T1, as illustrated in (B) of FIG. 7. In such a case, a volume density of the positive electrode active material in the first part P1 and a volume density of the positive electrode active material in the second part P2 may be the same as or different from each other. Further, the second thickness T2 is preferably greater than or equal to 70% and less than or equal to 95% of the first thickness T1.

Alternatively, the volume density of the positive electrode active material in the first part P1 and the volume density of the positive electrode active material in the second part P2 may be different from each other. It is possible to achieve such a configuration, for example, by making a material kind of the positive electrode active material in the first part P1 and a material kind of the positive electrode active material in the second part P2 different from each other. In this case, the first thickness T1 of the first part P1 and the second thickness T2 of the second part P2 may be made substantially the same as or different from each other.

Upon charging the secondary battery, lithium is extracted from the positive electrode 11, and the extracted lithium is inserted into the negative electrode 12 via the electrolytic solution. Upon discharging the secondary battery, lithium is extracted from the negative electrode 12, and the extracted lithium is inserted into the positive electrode 11 via the electrolytic solution. Upon charging and discharging, lithium is inserted and extracted in an ionic state.

In a case of manufacturing the secondary battery, the positive electrode 11 and the negative electrode 12 are fabricated and the electrolytic solution is prepared, following which the secondary battery is fabricated using the positive electrode 11, the negative electrode 12, and the electrolytic solution, according to a procedure as an example to be described below. In the following, the illustrated contents of FIGS. 1 to 7 which have already been described will be cited as needed.

First, the positive electrode active material and, on an as-needed basis, materials including, without limitation, the positive electrode binder and the positive electrode conductor are mixed with each other to thereby obtain a positive electrode mixture. Thereafter, the positive electrode mixture is put into a solvent such as an organic solvent to thereby prepare a positive electrode mixture slurry in paste form. Lastly, the positive electrode mixture slurry is applied on the opposite surfaces of the positive electrode current collector 11A to thereby form the positive electrode active material layers 11B. In this case, as described above, a range over which the positive electrode mixture slurry is to be applied is so adjusted that the positive electrode active material layer 11B is formed on a portion of each of the opposite surfaces of the positive electrode current collector 11A. Thereafter, the positive electrode active material layers 11B may be compression-molded by means of a roll pressing machine. In this case, the positive electrode active material layers 11B may be heated. The positive electrode active material layers 11B may be compression-molded multiple times. In this manner, the positive electrode active material layers 11B are formed on the respective opposite surfaces of the positive electrode current collector 11A. In addition, a portion of the positive electrode active material layer 11B1 formed in a region of the inner surface S1 of the positive electrode current collector 11A (see (B) of FIG. 7) in which the second part P2 is to be formed is so removed selectively as to be dug down in the thickness direction. Thus, the first part P1 and the second part P2 are formed. As a result, the positive electrode 11 is obtained.

The negative electrode active material layers 12B are formed on the respective opposite surfaces of the negative electrode current collector 12A by a procedure similar to the fabrication procedure of the positive electrode 11 described above. Specifically, the negative electrode active material and, on an as-needed basis, materials including, without limitation, the negative electrode binder and the negative electrode conductor are mixed with each other to thereby obtain a negative electrode mixture. Thereafter, the negative electrode mixture is put into a solvent such as an organic solvent to thereby prepare a negative electrode mixture slurry in paste form. Thereafter, the negative electrode mixture slurry is applied on the opposite surfaces of the negative electrode current collector 12A to thereby form the negative electrode active material layers 12B. In this case, as described above, a range over which the negative electrode mixture slurry is to be applied is so adjusted that the negative electrode active material layer 12B is formed on a portion of each of the opposite surfaces of the negative electrode current collector 12A. Thereafter, the negative electrode active material layers 12B may be compression-molded. In this manner, the negative electrode active material layers 12B are formed on the respective opposite surfaces of the negative electrode current collector 12A, and the negative electrode 12 is obtained.

The electrolyte salt is put into a solvent. The electrolyte salt is thereby dispersed or dissolved in the solvent. As a result, the electrolytic solution is prepared.

First, the porous layer 13A is prepared. Thereafter, the polymer compound and the inorganic particles are put into a solvent such as an organic solvent to thereby prepare a slurry in paste form. Thereafter, the slurry is applied on the opposite surfaces of the porous layer 13A to thereby form the polymer compound layers 13B. Thus, the separator 13 is fabricated.

First, the positive electrode lead 14 is coupled to the positive electrode end part 11T of the positive electrode 11 by a method such as a welding method. Thereafter, the negative electrode lead 15 is coupled to the negative electrode end part 12T of the negative electrode 12 by a method such as a welding method. Thereafter, the positive electrode 11 and the negative electrode 12 are stacked on each other with the separator 13 interposed therebetween, following which the stack of the positive electrode 11, the negative electrode 12, and the separator 13 is wound about the winding axis J in the winding direction D to thereby fabricate a wound body. Thereafter, the wound body is pressed by means of, for example, a pressing machine to thereby so shape the wound body that the section, of the wound body, intersecting the winding axis J has an elongated shape.

Thereafter, the wound body is placed inside the depression part 20U, following which the outer package film 20 is folded in the direction of the arrow R. Thereafter, outer edge parts of two sides of the outer package film 20 (the fusion-bonding layer) are adhered to each other by a method such as a thermal-fusion-bonding method to thereby allow the wound body to be contained inside the outer package film 20 having a pouch shape.

Lastly, the electrolytic solution is injected into the outer package film 20 having the pouch shape, following which outer edge parts of the remaining one side of the outer package film 20 (the fusion-bonding layer) are adhered to each other by a method such as a thermal-fusion-bonding method. In this case, the sealing film 21 is interposed between the outer package film 20 and the positive electrode lead 14, and the sealing film 22 is interposed between the outer package film 20 and the negative electrode lead 15. The wound body is thereby impregnated with the electrolytic solution, and the battery device 10 is fabricated. The battery device 10 is sealed in the outer package film 20 having the pouch shape. As a result, the assembly of the secondary battery is completed.

The secondary battery after being assembled is charged and discharged. Various conditions including, for example, an environment temperature, the number of times of charging and discharging (the number of cycles), and charging and discharging conditions may be set as desired. A film is thereby formed on the surface of the negative electrode 12, for example, and the state of the secondary battery is electrochemically stabilized. The secondary battery that includes the outer package film 20, that is, the secondary battery of the laminated-film type is thus completed.

According to the secondary battery of an embodiment, at least the positive electrode active material layer 11B1 in the innermost wind of the positive electrode 11 of the battery device 10 having the elongated shape includes the first part P1 and the second part P2. The second part P2 is provided at least on both the whole of the positive electrode active material layer 11B1 in the innermost wind in the curved region 10A and the positive electrode active material layer 11B1 in the innermost wind in a portion, of the flat region 10B, that is in the vicinity of the border between the flat region 10B and the curved region 10A. Thus, even in the curved region 10A, it is possible to set the utilization rate of the negative electrode 12 to less than or equal to 100%, and to suppress the precipitation of metallic lithium. Further, it is possible to suppress a decrease in the negative electrode utilization rate of the battery device 10 as a whole, and to increase the battery capacity. In addition, it is possible to effectively prevent cracking of the positive electrode active material layer 11B1 in the curved region 10A.

Figure 8:
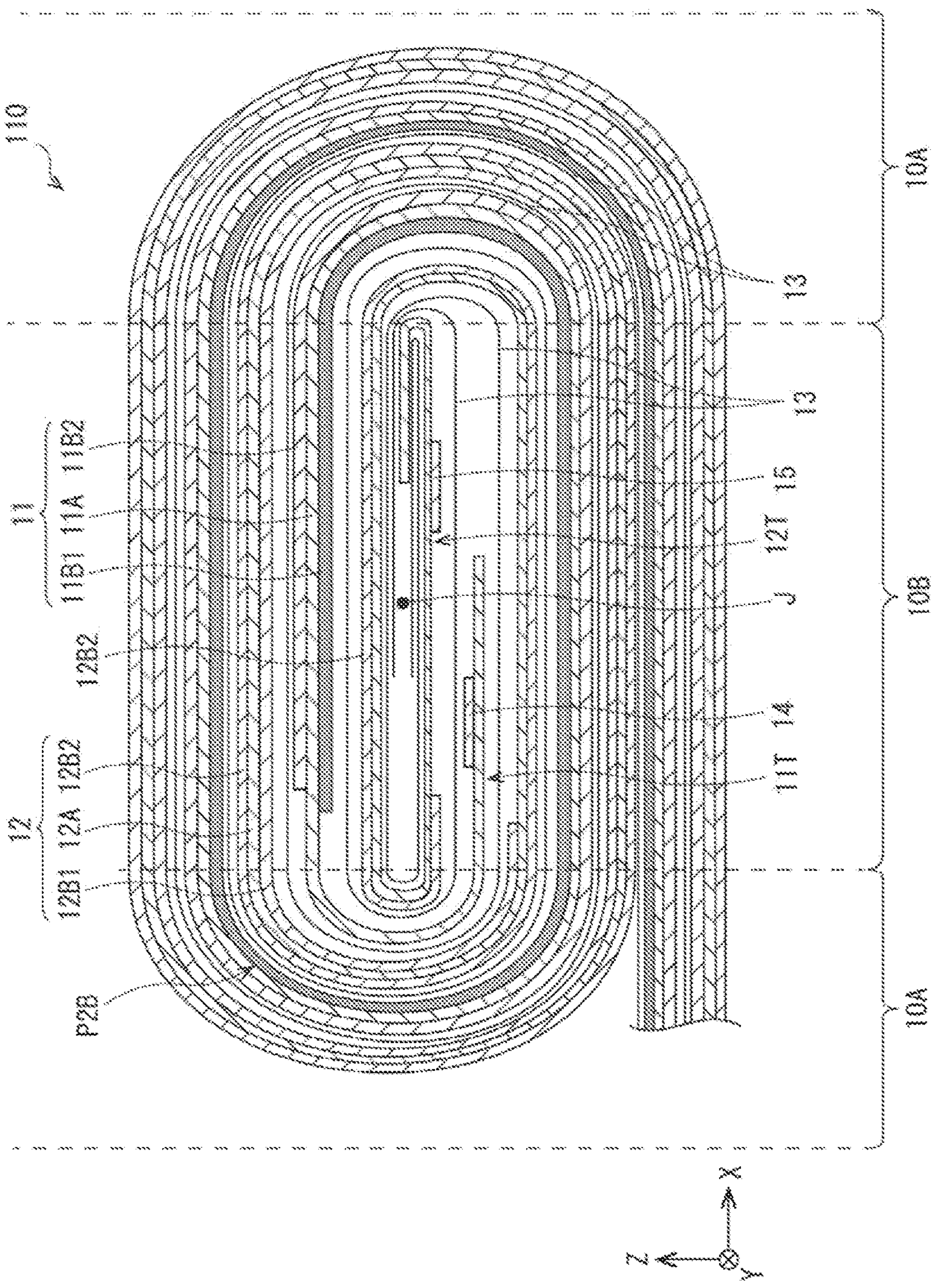
FIG. 8 is a sectional view of a configuration of a secondary battery according to a comparative example.

FIG. 8 illustrates an enlarged sectional configuration of a portion of a battery device 110 according to a comparative example. In the battery device 110 according to the comparative example of FIG. 8, the area density of the positive electrode active material in the positive electrode active material layer 11B1 is substantially uniform. Except for this, the battery device 110 has substantially the same configuration as the battery device 10 illustrated in, for example, FIGS. 1 to 3. That is, in the battery device 110, a thickness of the positive electrode active material layer 11B1 provided on the inner surface of the positive electrode current collector 11A is substantially constant, and a volume density of the positive electrode active material included in the positive electrode active material layer 11B1 is also substantially constant.

Figure 9A:
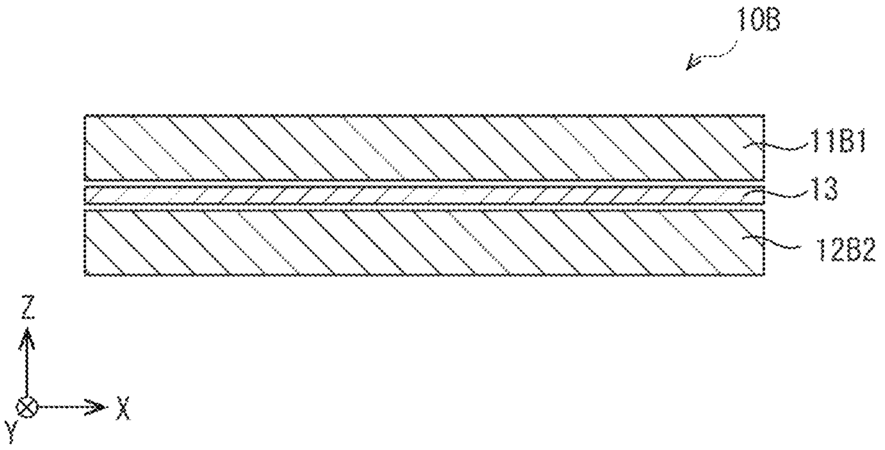
FIG. 9A is an enlarged sectional view of a configuration of a portion of a flat region of a battery device illustrated in FIG. 8.
Figure 9B:
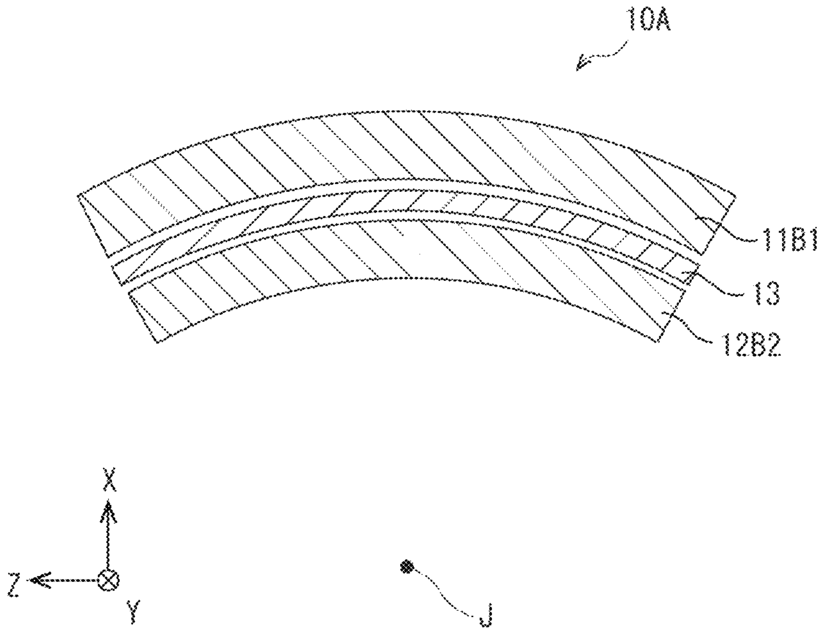
FIG. 9B is an enlarged sectional view of a configuration of a portion of a curved region of the battery device illustrated in FIG. 8.

FIG. 9A is a sectional view schematically illustrating a portion of the flat region 10B of the battery device 110 according to the comparative example illustrated in FIG. 8. FIG. 9B is a sectional view schematically illustrating a portion of the curved region 10A of the battery device 110 according to the comparative example illustrated in FIG. 8. As illustrated in FIG. 9A, in the flat region 10B of the battery device 110, both the positive electrode active material layer 11B1 and the negative electrode active material layer 12B2 extend substantially parallel along an XY plane and are so opposed to each other with the separator 13 interposed therebetween as to overlap each other in the thickness direction. As illustrated in FIG. 9B, the positive electrode active material layer 11B1 provided in the curved region 10A of the battery device 110 and the negative electrode active material layer 12B2 provided in the curved region 10A of the battery device 110 are also so opposed to each other with the separator 13 interposed therebetween as to overlap each other in the thickness direction. However, both the positive electrode active material layer 11B1 and the negative electrode active material layer 12B2 are curved, and when viewed from the winding axis J, the positive electrode active material layer 11B1 is located on an outer side of the negative electrode active material layer 12B2. Thus, a volume of a portion, of the positive electrode active material layer 11B1, that is opposed to the negative electrode active material layer 12B2 provided in a unit area in the curved region 10A is larger than a volume of a portion, of the positive electrode active material layer 11B1, that is opposed to the negative electrode active material layer 12B2 provided in a unit area in the flat region 10B. Accordingly, in the battery device 110, when the positive electrode active material layer 11B1 and the negative electrode active material layer 12B2 are so adjusted that the negative electrode utilization rate in the flat region 10B becomes 100%, i.e., that the positive electrode discharge capacity per unit area in the flat region 10B and the negative electrode discharge capacity per unit area in the flat region 10B are substantially equal to each other, the positive electrode discharge capacity per unit area can become larger than the negative electrode discharge capacity per unit area in the curved region 10A. In such a case, the negative electrode utilization rate exceeds 100%, which can cause precipitation of metallic lithium by repeated charging and discharging cycles, and can easily degrade the negative electrode 12. Such concerns are likely to arise between the positive electrode active material layer 11B1 in the innermost wind and the negative electrode active material layer 12B2 opposed to the positive electrode active material layer 11B1 on the inner side of the winding.

Accordingly, in an embodiment, the second part P2 is provided on a portion, of the positive electrode active material layer 11B1 in the innermost wind, that occupies at least both the curved region 10A and a portion of the flat region 10B that is continuous to the curved region 10A. That is, the area density of the positive electrode active material of the portion, of the positive electrode active material layer 11B1 in the innermost wind, that occupies the curved region 10A and the portion, of the flat region 10B, that is in the vicinity of the curved region 10A is made lower than the area density of the positive electrode active material in a portion on the periphery thereof. By doing so, even when adjustment is so performed that the negative electrode utilization rate in the flat region 10B becomes 100%, it is possible to avoid the negative electrode utilization rate in the curved region 10A exceeding 100%. As a result, it is possible to improve a battery capacity while suppressing degradation of the negative electrode 12.

In particular, the second area density D2 in the second part P2 may be greater than or equal to 70% and less than or equal to 95% of the first area density D1 in the first part P1. This makes it possible to suppress the precipitation of metallic lithium and ensure a higher battery capacity.

Next, a description is given of modifications of the secondary battery according to an embodiment. The configuration of the secondary battery described above is appropriately modifiable including as described below. Note that any two or more of the following series of modifications may be combined with each other.

In FIGS. 3 and 7, the second part P2 is so provided as to occupy the whole of each of respective portions in the curved region 10A at the first to third locations counted from the positive electrode end part 11T on the inner side of the winding and the respective portions of the flat regions 10B located adjacent to the curved region 10A; however, the disclosure is not limited thereto. For example, the second part P2 may be so provided as to occupy the whole of each of the respective portions in the curved region 10A at the fourth and subsequent locations counted from the positive electrode end part 11T on the inner side of the winding and the respective portions of the flat regions 10B located adjacent to the curved region 10A. Alternatively, all of the portions of the positive electrode active material layer 11B1 each occupying the curved region 10A may be the second part P2.

In an embodiment described above, the area density is adjusted in fabricating the positive electrode 11, by selectively removing a portion of the positive electrode active material layer 11B1 having a uniform thickness; however, the disclosure is not limited thereto. For example, when the positive electrode mixture slurry is applied to the inner surface S1 of the positive electrode current collector 11A, a thickness of the positive electrode mixture slurry may be selectively changed depending on a location on the inner surface S1 of the positive electrode current collector 11A by using a variable head that is configured to change an ejection rate per hour.

Next, a description is given of applications (application examples) of the above-described secondary battery according to an embodiment.

The applications of the secondary battery are not particularly limited as long as they are, for example, machines, equipment, instruments, apparatuses, or systems (an assembly of a plurality of pieces of equipment, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. When the secondary battery is used as the auxiliary power source, the kind of the main power source is not limited to the secondary battery.

Specific examples of the applications of the secondary battery include: electronic equipment including portable electronic equipment; portable life appliances; apparatuses for data storage; electric power tools; battery packs to be mounted as detachable power sources on, for example, laptop personal computers; medical electronic equipment; electric vehicles; and electric power storage systems. Examples of the electronic equipment include video cameras, digital still cameras, mobile phones, laptop personal computers, cordless phones, headphone stereos, portable radios, portable televisions, and portable information terminals. Examples of the portable life appliances include electric shavers. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems for accumulation of electric power for a situation such as emergency. Note that the secondary battery may have a battery structure of the above-described laminated-film type, a cylindrical type, or any other type. Further, multiple secondary batteries may be used, for example, as a battery pack or a battery module.

In particular, the battery pack and the battery module are each effectively applied to relatively large-sized equipment, etc., including an electric vehicle, an electric power storage system, and an electric power tool. The battery pack, as will be described later, may include a single battery, or may include an assembled battery. The electric vehicle is a vehicle that operates (travels) using the secondary battery as a driving power source, and may be an automobile that is additionally provided with a driving source other than the secondary battery as described above, such as a hybrid automobile. The electric power storage system is a system that uses the secondary battery as an electric power storage source. An electric power storage system for home use accumulates electric power in the secondary battery serving as an electric power storage source, and the accumulated electric power may thus be utilized for using, for example, home appliances.

A typical application example of the secondary battery will now be described in detail. The configurations of the application examples described below are merely examples, and are appropriately modifiable.

Figure 10:
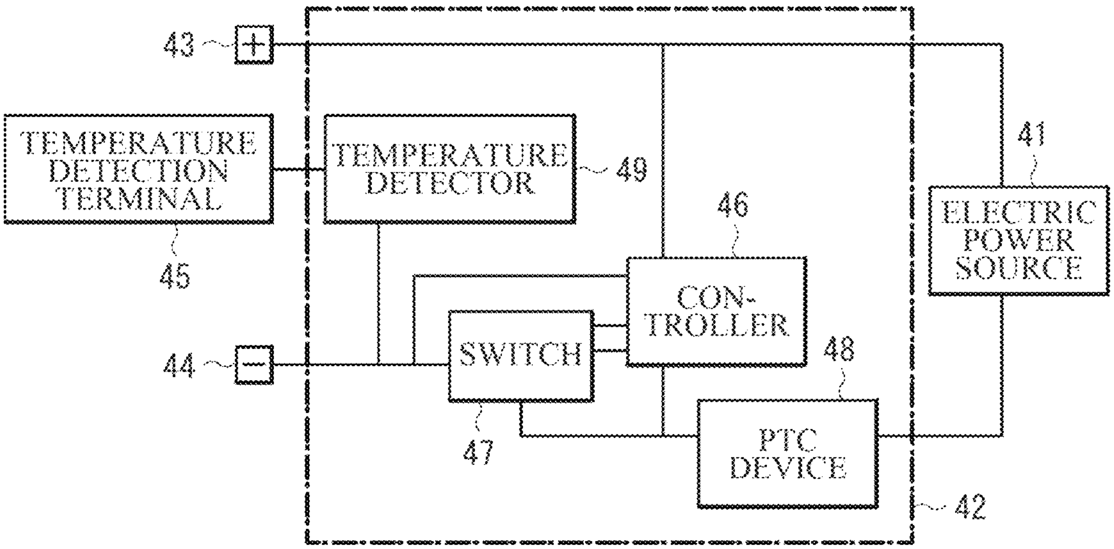
FIG. 10 is a block diagram illustrating a configuration of an application example of the secondary battery, which is a battery pack.

FIG. 10 illustrates a block configuration of a battery pack. The battery pack described here is a simple battery pack (what is called a soft pack) including one secondary battery, and is to be mounted on, for example, electronic equipment typified by a smartphone.

As illustrated in FIG. 10, the battery pack includes an electric power source 41 and a circuit board 42. The circuit board 42 is coupled to the electric power source 41, and includes a positive electrode terminal 43, a negative electrode terminal 44, and a temperature detection terminal 45. The temperature detection terminal 45 is what is called a T terminal.

The electric power source 41 includes one secondary battery. The secondary battery has a positive electrode lead coupled to the positive electrode terminal 43 and a negative electrode lead coupled to the negative electrode terminal 44. The electric power source 41 is couplable to outside via the positive electrode terminal 43 and the negative electrode terminal 44, and is thus chargeable and dischargeable via the positive electrode terminal 43 and the negative electrode terminal 44. The circuit board 42 includes a controller 46, a switch 47, a thermosensitive resistive device (a positive temperature coefficient (PTC) device) 48, and a temperature detector 49. However, the PTC device 48 may be omitted.

The controller 46 includes, for example, a central processing unit (CPU) and a memory, and controls an overall operation of the battery pack. The controller 46 detects and controls a use state of the electric power source 41 on an as-needed basis.

If a battery voltage of the electric power source 41 (the secondary battery) reaches an overcharge detection voltage or an overdischarge detection voltage, the controller 46 turns off the switch 47. This prevents a charging current from flowing into a current path of the electric power source 41. In addition, if a large current flows upon charging or discharging, the controller 46 turns off the switch 47 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 47 includes, for example, a charge control switch, a discharge control switch, a charging diode, and a discharging diode. The switch 47 performs switching between coupling and decoupling between the electric power source 41 and external equipment in accordance with an instruction from the controller 46. The switch 47 includes, for example, a metal-oxide-semiconductor field-effect transistor (MOSFET). The charging and discharging currents are detected on the basis of an ON-resistance of the switch 47.

The temperature detector 49 includes a temperature detection device such as a thermistor. The temperature detector 49 measures a temperature of the electric power source 41 using the temperature detection terminal 45, and outputs a result of the temperature measurement to the controller 46. The result of the temperature measurement to be obtained by the temperature detector 49 is used, for example, when the controller 46 performs charge and discharge control upon abnormal heat generation or when the controller 46 performs a correction process upon calculating a remaining capacity.

Examples

A description is given of Examples of the present technology according to an embodiment.

Example 1

As described below, the secondary batteries of the laminated-film type (the lithium-ion secondary batteries) illustrated in, for example, FIG. 1 were fabricated, following which the secondary batteries were each evaluated for its cyclability characteristic.

[Fabrication of Secondary Battery]

The secondary batteries were fabricated in accordance with the following procedure.

(Fabrication of Positive Electrode)

First, 96 parts by mass of the positive electrode active material (lithium cobalt oxide ($LiCoO_2$)), 1 part by mass of the positive electrode binder (polyvinylidene difluoride), and 3 parts by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby prepare a positive electrode mixture slurry in paste form. Thereafter, the positive electrode mixture slurry was applied on the opposite surfaces of the positive electrode current collector 11A (an aluminum foil having a thickness of 10 μm) by means of a coating apparatus, following which the applied positive electrode mixture slurry was dried to thereby form the positive electrode active material layers 11B. Here, in applying the positive electrode mixture slurry to the surface to be the inner surface S1 of the positive electrode current collector 11A, the ejection rate was changed by the variable head to reduce an amount of the positive electrode mixture slurry in a portion of the part that is to occupy the curved region 10A, so as to selectively lower the area density of the positive electrode active material. In Example 1, in the positive electrode active material layers 11B1 and 11B2, the first area density D1 of the positive electrode active material in the first part P1 was set to 30.84 mg/cm$^2$ (100%). However, in the positive electrode active material layer 11B1, the second area density D2 of the positive electrode active material in the second parts P2 at three locations each occupying corresponding one of the respective portions in the curved region 10A at the first to third locations counted from the positive electrode end part 11T and a portion, of the flat region 10B, that is in the vicinity of the corresponding one of the respective portions in the curved region 10A at the first to third locations was set to 27.78 mg/cm$^2$ (90%). A length in a longitudinal direction of the positive electrode active material layer 11B1 was set to 939 mm. A length in a longitudinal direction of the second part P2 was set to 5 mm. Thereafter, the positive electrode active material layers 11B were compression-molded by means of a roll pressing machine, following which a heat treatment at 150° ° C. was performed to improve a binding property of the positive electrode active material. Lastly, a resultant was cut to have a width of 75.6 mm, following which the positive electrode lead 14 was welded to the positive electrode end part 11T. In this manner, the positive electrode 11 was fabricated. An insulating tape was attached to protect a surface of the positive electrode current collector 11A on which no positive electrode active material layer 11B was provided.

The first area density D1 in the first part P1 was determined as follows. First, the battery was completely discharged and was thereafter disassembled to take out the positive electrode 11. Thereafter, the positive electrode 11 was washed with a solvent (e.g., dimethyl carbonate), following which the positive electrode 11 was sufficiently dried. Thereafter, the positive electrode active material layer 11B2 provided on the outer surface S2 of the positive electrode current collector 11A was peeled off by, for example, a fabric impregnated with a solvent (e.g., N-methyl-2-pyrrolidone). Thereafter, the solvent remaining on the outer surface S2 of the positive electrode current collector 11A was wiped with a fabric impregnated with ethanol, following which the positive electrode active material layer 11B1 was sufficiently dried at a room temperature. In this manner, the positive electrode 11 including the positive electrode active material layer 11B1 only on the inner surface S1 of the positive electrode current collector 11A was obtained. Thereafter, a portion of the positive electrode active material layer 11B1 corresponding to the first part P1 was punched together with the positive electrode current collector 11A in a circular shape having a diameter of 5 mm, and the mass A1 [mg] was measured. Thereafter, a portion, of the positive electrode 21, where neither the positive electrode active material layer 11B1 nor the positive electrode active material layer 11B2 was provided and both the inner surface S1 and the outer surface S2 of the positive electrode current collector 11A were exposed was punched in a manner similar to that described above, and the mass B [mg] was measured. Thereafter, the first area density D1 was calculated by the following expression. Note that in this Example, the first area density D1 was calculated for each of 10 first parts P1, and a simple average thereof was determined.

$$\text{First area density } D1\ [\text{mg/cm}^2] = (\text{mass } A1\ [\text{mg}] - \text{mass } B\ [\text{mg}])/(\text{punched area } [\text{cm}^2])$$

The second area density D2 in the second part P2 was determined as follows. First, the positive electrode active material layer 11B1 was sufficiently dried, following which a portion of the positive electrode active material layer 11B1 corresponding to the second part P2 was punched into a circular shape having a diameter of 5 mm, and the mass A2 [mg] was measured. Thereafter, the portion, of the positive electrode 21, where neither the positive electrode active material layer 11B1 nor the positive electrode active material layer 11B2 was provided and both the inner surface S1 and the outer surface S2 of the positive electrode current collector 11A were exposed was punched in a manner similar to that described above, and the mass B [mg] was measured. Thereafter, the second area density D2 was calculated by the following expression. Note that in this Example, the second area density D2 was calculated for each of 10 second parts P2, and a simple average thereof was determined.

$$\text{Second area density } D2\ [\text{mg/cm}^2] = (\text{mass } A2\ [\text{mg}] - \text{mass } B\ [\text{mg}])/(\text{punched area } [\text{cm}^2])$$

(Fabrication of Negative Electrode)

First, 93 parts by mass of the negative electrode active material (artificial graphite that was the carbon material) and 7 parts by mass of the negative electrode binder (polyvinylidene difluoride) were mixed with each other to thereby obtain a negative electrode mixture. Thereafter, the negative electrode mixture was put into an organic solvent (N-methyl-2-pyrrolidone), following which the organic solvent was stirred to thereby prepare a negative electrode mixture slurry in paste form. Thereafter, the negative electrode mixture slurry was applied on the opposite surfaces of the negative electrode current collector 12A (a copper foil having a thickness of 15 μm) by means of a coating apparatus, following which the applied negative electrode mixture slurry was dried to thereby form the negative electrode active material layers 12B. In this case, a range over which the negative electrode mixture slurry was to be applied was so adjusted that no negative electrode active material layer 12B was formed on both end parts of the negative electrode current collector 12A in the winding direction D, which caused the negative electrode current collector 12A to be exposed at the negative electrode end part 12T. Thereafter, the negative electrode active material layers 12B were compression-molded by means of a roll pressing machine, following which a heat treatment at 200° ° C. was performed to improve a binding property of the negative electrode active material. Lastly, a resultant was cut to have a width of 77.4 mm, following which the negative electrode lead 15 was welded to the negative electrode end part 12T. In this manner, the negative electrode 12 was fabricated. An insulating tape was attached to protect a surface of the negative electrode current collector 12A on which no negative electrode active material layer 12B was provided.

(Preparation of Electrolytic Solution)

The electrolyte salt (lithium hexafluorophosphate ($LiPF_6$)) was added to the solvent (ethylene carbonate, propylene carbonate, diethyl carbonate, and propyl propionate), following which the solvent was stirred. In this case, a mixture ratio (a weight ratio) of the solvent between ethylene carbonate, propylene carbonate, diethyl carbonate, and propyl propionate was set to 30:10:40:20. A content of the electrolyte salt was set to 1 mol/kg with respect to the solvent. The electrolyte salt was thereby dissolved in the solvent. Thus, the electrolytic solution was prepared.

(Assembly of Secondary Battery)

The positive electrode 11 and the negative electrode 12 were stacked on each other with the separator 13 interposed therebetween, following which the stack of the positive electrode 11, the negative electrode 12, and the separator 13 was wound about the winding axis J in the winding direction D to thereby fabricate a wound body. Thereafter, the wound body was pressed by means of a pressing machine at a pressure of 1 $N/cm^2$ to thereby so shape the wound body that the section, of the wound body, intersecting the winding axis J had an elongated shape. In this case, a length of the flat region 10B along the major axis K1 in the X-axis direction was set to 55.1 mm. Further, lengths of the respective portions of the positive electrode active material layer 11B1 in the respective portions in the curved region 10A at the first to fourth locations counted from the positive electrode end part 11T were set to 1.6 mm, 2.1 mm, 2.3 mm, and 2.7 mm, respectively.

Thereafter, the outer package film 20 was so folded as to sandwich the wound body contained in the depression part 20U. Thereafter, the respective outer edge parts of two sides of the outer package film 20 were thermal-fusion-bonded to each other to thereby allow the wound body to be contained inside the outer package film 20 having the pouch shape. As the outer package film 20, an aluminum laminated film was used in which a fusion-bonding layer (a polypropylene film having a thickness of 30 μm), a metal layer (an aluminum foil having a thickness of 40 μm), and a surface protective layer (a nylon film having a thickness of 25 μm) were stacked in this order from an inner side.

Thereafter, the electrolytic solution was injected into the outer package film 20 having the pouch shape and thereafter, the respective outer edge parts of the remaining one side of the outer package film 20 were thermal-fusion-bonded to each other in a reduced-pressure environment. In this case, the sealing film 21 (a polypropylene film having a thickness of 5 μm) was interposed between the outer package film 20 and the positive electrode lead 14, and the sealing film 22 (a polypropylene film having a thickness of 5 μm) was interposed between the outer package film 20 and the negative electrode lead 15. In this manner, the wound body was impregnated with the electrolytic solution, and the battery device 10 was thus fabricated. Accordingly, the battery device 10 was sealed in the outer package film 20. As a result, the secondary battery was assembled.

[Evaluation of Cyclability Characteristic]

Evaluation of the cyclability characteristic of the secondary battery based on a charging and discharging cycle test revealed the results presented in Table 1.

In the charging and discharging cycle test, first, the secondary battery was charged and discharged in an ambient temperature environment (at a temperature of 25° C.) to thereby measure a discharge capacity (a first-cycle discharge capacity). Thereafter, the secondary battery was repeatedly charged and discharged in the same environment until the total number of cycles reached 1000 to thereby measure the discharge capacity (a 1000th-cycle discharge capacity). Lastly, the following was calculated: capacity retention rate (%)=(1000th-cycle discharge capacity/first-cycle discharge capacity)×100.

In a charging and discharging cycle test, upon charging, the secondary battery was charged with a constant current of 2 C until a battery voltage reached 4.25 V, and was thereafter charged with a constant voltage of 4.45 V until a current reached 0.025 C. Upon discharging, the secondary battery was discharged with a constant current of 0.7 C until the battery voltage reached 3.0 V. Note that 2 C was a value of a current that caused a battery capacity (a theoretical capacity) to be completely discharged in 0.5 hours, and 0.7 C was a value of a current that caused the battery capacity to be completely discharged in 1.43 hours.

In addition, measurement was performed of the negative electrode utilization rate of a portion, of the negative electrode 12, that was opposed to each of the portions of the positive electrode active material layer 11B1 provided in the respective portions in the curved region 10A at the first to fourth locations counted from the positive electrode end part 11T based on when the secondary battery was charged at a battery voltage of 4.45 V.

TABLE 1

| | First part | Second part | | | | 1000th cycle | | | |
|---|---|---|---|---|---|---|---|---|---|
| | Area density [mg/cm$^2$] | Area density [mg/cm$^2$] | Ratio [%] | Length [%] | Location | Capacity [mAh] | Retention rate [%] | Swelling [%] | Li precipitation |
| Example 1 | 30.84 | 27.78 | 90 | 5 | 1 to 3 | 3446.0 | 96.2 | 4.9 | No |
| Example 2 | 30.84 | 27.78 | 90 | 3 | 1 to 3 | 3467.6 | 96.1 | 4.8 | No |
| Example 3 | 30.84 | 27.78 | 90 | 2.1 | 1 to 3 | 3482.7 | 92.0 | 5.8 | Yes in part |
| Example 4 | 30.84 | 27.78 | 90 | 1 | 1 to 3 | 3489.2 | 79.1 | 11.5 | Yes in part |
| Example 5 | 30.84 | 30.18 | 98 | 5 | 1 to 3 | 3441.3 | 93.4 | 7.2 | No |
| Example 6 | 30.84 | 29.31 | 95 | 5 | 1 to 3 | 3443.0 | 95.5 | 5.9 | No |
| Example 7 | 30.84 | 24.72 | 80 | 5 | 1 to 3 | 3452.0 | 95.2 | 5.5 | No |
| Example 8 | 30.84 | 21.54 | 70 | 5 | 1 to 3 | 3458.1 | 95.0 | 6.1 | No |
| Example 9 | 30.84 | 18.48 | 60 | 5 | 1 to 3 | 3464.1 | 91.0 | 7.1 | No |
| Example 10 | 30.84 | 9.30 | 30 | 5 | 1 to 3 | 3481.9 | 90.0 | 7.5 | No |
| Example 11 | 30.84 | 27.78 | 90 | 5 | 1 | 3482.0 | 87.5 | 9.5 | Yes in part |
| Example 12 | 30.84 | 27.78 | 90 | 5 | 1 to 2 | 3464.0 | 94.3 | 6.0 | Yes in part |
| Example 13 | 30.84 | 27.78 | 90 | 5 | 1 to 4 | 3428.0 | 96.1 | 5.0 | No |
| Comparative example 1 | 30.84 | 30.84 | 100 | 5 | — | 3500.0 | 78.6 | 13.1 | Yes |

(Stabilization of Secondary Battery)

In a state in which the secondary battery after an elapse of 48 hours or longer from the injection of the electrolytic solution was heated to 60° C., the secondary battery was charged to be a fully charged state while being subjected to pressure application of 20 kgf/cm$^2$.

As a result, a film was formed on a surface of, for example, the negative electrode 12, which stabilized the secondary battery. Thus, the secondary battery of the laminated-film type was completed.

[Evaluation of Precipitation of Lithium Compound]

The secondary battery after being subjected to the charging and discharging cycle test was also evaluated for a lithium compound precipitated on the surface of the negative electrode. The lithium compound was a main cause of swelling of the battery device. The results are also presented in Table 1. The precipitation of the lithium compound was evaluated by the following procedure in dry air, i.e., in a dry environment. First, the secondary battery after being subjected to the charging and discharging cycle test was disassembled to take out the negative electrode. Thereafter, the electrolytic solution was removed, with use of dimethyl carbonate, from the negative electrode that had been taken out. Thereafter, the negative electrode was washed, and dried at an ambient temperature and in a vacuum environment. Lastly, the surface of the negative electrode was visually observed, and presence or absence of the lithium compound was checked.

Example 2

The length in the longitudinal direction of the second part P2 was set to 3 mm. Except for this point, the secondary battery of Example 2 was fabricated in a manner similar to that in Example 1, and was subjected to an evaluation similar to that in Example 1. The results are also presented in Table 1.

Example 3

The length in the longitudinal direction of the second part P2 was set to 1.6 mm. That is, a whole of or only a portion of the positive electrode active material layer 11B1 in each of the respective portions in the curved region 10A at the first to third locations counted from the positive electrode end part 11T included the second part P2, and the positive electrode active material layer 11B1 in the flat region 10B included no second part P2. Except for this point, the secondary battery of Example 3 was fabricated in a manner similar to that in Example 1, and was subjected to an evaluation similar to that in Example 1. The results are also presented in Table 1. As for the negative electrode utilization rate, a utilization rate of a portion, of the negative electrode, that was opposed to the second part P2 within a portion, of the positive electrode active material layer 11B1, that occupied the curved region 10A was within a range from 93.3% to 97.8% both inclusive, and a utilization rate of a portion, of the negative electrode, that was opposed to the first part P1 within the portion, of the positive electrode active material layer 11B1, that occupied the curved region 10A was within a range from 97.8% to 107.7% both inclusive.

Example 4

The length in the longitudinal direction of the second part P2 was set to 1.0 mm. That is, only a portion of the positive electrode active material layer 11B1 in each of the respective portions in the curved region 10A at the first to third locations counted from the positive electrode end part 11T included the second part P2, and the positive electrode active material layer 11B1 in the flat region 10B included no second part P2. Except for this point, the secondary battery of Example 4 was fabricated in a manner similar to that in Example 1, and was subjected to an evaluation similar to that in Example 1. The results are also presented in Table 1. As for the negative electrode utilization rate, the utilization rate of the portion, of the negative electrode, that was opposed to the second part P2 within the portion, of the positive electrode active material layer 11B1, that occupied the curved region 10A was within a range from 93.3% to 97.8% both inclusive, and the utilization rate of the portion, of the negative electrode, that was opposed to the first part P1 within the portion, of the positive electrode active material layer 11B1, that occupied the curved region 10A was within a range from 97.8% to 107.7% both inclusive.

Example 5

The area density of the positive electrode active material in the second parts P2 at three locations of the positive electrode active material layer 11B1 was set to 30.18 $mg/cm^2$ (98%). The three locations each occupied corresponding one of the respective portions in the curved region 10A at the first to third locations counted from the positive electrode end part 11T and a portion, of the flat region 10B, that was in the vicinity of the corresponding one of the respective portions in the curved region 10A at the first to third locations. Except for this point, the secondary battery of Example 5 was fabricated in a manner similar to that in Example 1, and was subjected to an evaluation similar to that in Example 1. The results are also presented in Table 1.

Example 6

The area density of the positive electrode active material in the second parts P2 at three locations of the positive electrode active material layer 11B1 was set to 29.31 $mg/cm^2$ (95%). The three locations each occupied corresponding one of the respective portions in the curved region 10A at the first to third locations counted from the positive electrode end part 11T and a portion, of the flat region 10B, that was in the vicinity of the corresponding one of the respective portions in the curved region 10A at the first to third locations. Except for this point, the secondary battery of Example 6 was fabricated in a manner similar to that in Example 1, and was subjected to an evaluation similar to that in Example 1. The results are also presented in Table 1.

Example 7

The area density of the positive electrode active material in the second parts P2 at three locations of the positive electrode active material layer 11B1 was set to 24.72 $mg/cm^2$ (80%). The three locations each occupied corresponding one of the respective portions in the curved region 10A at the first to third locations counted from the positive electrode end part 11T and a portion, of the flat region 10B, that was in the vicinity of the corresponding one of the respective portions in the curved region 10A at the first to third locations. Except for this point, the secondary battery of Example 7 was fabricated in a manner similar to that in Example 1, and was subjected to an evaluation similar to that in Example 1. The results are also presented in Table 1.

Example 8

The area density of the positive electrode active material in the second parts P2 at three locations of the positive electrode active material layer 11B1 was set to 21.54 $mg/cm^2$ (70%). The three locations each occupied corresponding one of the respective portions in the curved region 10A at the first to third locations counted from the positive electrode end part 11T and a portion, of the flat region 10B, that was in the vicinity of the corresponding one of the respective portions in the curved region 10A at the first to third locations. Except for this point, the secondary battery of Example 8 was fabricated in a manner similar to that in Example 1, and was subjected to an evaluation similar to that in Example 1. The results are also presented in Table 1.

Example 9

The area density of the positive electrode active material in the second parts P2 at three locations of the positive electrode active material layer 11B1 was set to 18.48 $mg/cm^2$ (60%). The three locations each occupied corresponding one of the respective portions in the curved region 10A at the first to third locations counted from the positive electrode end part 11T and a portion, of the flat region 10B, that was in the vicinity of the corresponding one of the respective portions in the curved region 10A at the first to third locations. Except for this point, the secondary battery of Example 9 was fabricated in a manner similar to that in Example 1, and was subjected to an evaluation similar to that in Example 1. The results are also presented in Table 1.

Example 10

The area density of the positive electrode active material in the second parts P2 at three locations of the positive electrode active material layer 11B1 was set to 9.30 mg/$cm^2$ (30%). The three locations each occupied corresponding one of the respective portions in the curved region 10A at the first to third locations counted from the positive electrode end part 11T and a portion, of the flat region 10B, that was in the vicinity of the corresponding one of the respective portions in the curved region 10A at the first to third locations. Except for this point, the secondary battery of Example 10 was fabricated in a manner similar to that in Example 1, and was subjected to an evaluation similar to that in Example 1. The results are also presented in Table 1.

Example 11

The area density of the positive electrode active material in the second part P2 at one location of the positive electrode active material layer 11B1 was set to 27.78 mg/$cm^2$ (90%). The one location occupied the portion in the curved region 10A at the first location counted from the positive electrode end part 11T and a portion, of the flat region 10B, that was in the vicinity of the curved region 10A at the first location. The area density of the positive electrode active material in a portion, of the positive electrode active material layer 11B1, that occupied each of the respective portions in the curved region 10A at the second and subsequent locations counted from the positive electrode end part 11T was set to 30.84 mg/$cm^2$ (100%). Except for this point, the secondary battery of Example 11 was fabricated in a manner similar to that in Example 1, and was subjected to an evaluation similar to that in Example 1. The results are also presented in Table 1.

Example 12

The area density of the positive electrode active material in the second parts P2 at two locations of the positive electrode active material layer 11B1 was set to 27.78 mg/$cm^2$ (90%). The two locations each occupied corresponding one of the respective portions in the curved region 10A at the first and second locations counted from the positive electrode end part 11T and a portion, of the flat region 10B, that was in the vicinity of the corresponding one of the respective portions in the curved region 10A at the first and second locations. The area density of the positive electrode active material in a portion, of the positive electrode active material layer 11B1, that occupied each of the respective portions in the curved region 10A at the third and subsequent locations counted from the positive electrode end part 11T was set to 30.84 mg/$cm^2$ (100%). Except for this point, the secondary battery of Example 12 was fabricated in a manner similar to that in Example 1, and was subjected to an evaluation similar to that in Example 1. The results are also presented in Table 1.

Example 13

The area density of the positive electrode active material in the second parts P2 at four locations of the positive electrode active material layer 11B1 was set to 27.78 mg/$cm^2$ (90%). The four locations each occupied corresponding one of the respective portions in the curved region 10A at the first to fourth locations counted from the positive electrode end part 11T and a portion, of the flat region 10B, that was in the vicinity of the corresponding one of the respective portions in the curved region 10A at the first to fourth locations. The area density of the positive electrode active material in a portion, of the positive electrode active material layer 11B1, that occupied each of the respective portions in the curved region 10A at the fifth and subsequent locations counted from the positive electrode end part 11T was set to 30.84 mg/$cm^2$ (100%). Except for this point, the secondary battery of Example 13 was fabricated in a manner similar to that in Example 1, and was subjected to an evaluation similar to that in Example 1. The results are also presented in Table 1.

Comparative Example 1

The area density of the positive electrode active material in the whole of the positive electrode active material layer 11B1 was set to 15.42 mg/$cm^2$ (100%). Except for this point, the secondary battery of Comparative example 1 was fabricated in a manner similar to that in Example 1, and was subjected to an evaluation similar to that in Example 1. The results are also presented in Table 1.

As presented in Table 1, in Examples 1 to 13, it was possible to improve a 1000th-cycle capacity retention rate and suppress 1000th-cycle swelling as compared with Comparative example 1. Further, in Examples 1 to 13, it was possible to suppress the precipitation of the lithium compound as compared with Comparative example 1. A reason for this was considered as follows. The positive electrode active material layer 11B1 in the curved region 10A included the second part P2 having the area density lower than the area density of the first part P1, and this made it possible to keep the negative electrode utilization rate in the curved region 10A low.

Further, in Examples 1 and 2, it was possible to improve the 1000th-cycle capacity retention rate and suppress the 1000th-cycle swelling as compared with Examples 3 and 4. In addition, in Examples 1 and 2, it was possible to suppress the precipitation of the lithium compound as compared with Examples 3 and 4. In Examples 3 and 4, the second part P2 was provided only in the curved region 10A, whereas in Examples 1 and 2, the second part P2 extended over not only the curved region 10A but also a portion of the flat region 10B. Accordingly, it was considered that in Examples 1 and 2, it was possible to suppress the negative electrode utilization rate in the vicinity of the border between the curved region 10A and the flat region 10B to less than or equal to 100%, which made it possible to improve the capacity retention rate and the swelling.

Further, by comparing Examples 11 and 12 with Example 1, it was confirmed that providing the second part P2 so as to occupy at least each of the respective portions in the curved region 10A at the first to third locations counted from the positive electrode end part 11T made it possible to more effectively improve the 1000th-cycle capacity retention rate and suppress the 1000th-cycle swelling. Further, in Examples 11 and 12, the lithium compound was slightly precipitated on a portion, of the negative electrode 12, that was opposed to the positive electrode 11 in the vicinity of the positive electrode end part 11T. Therefore, it was confirmed that providing the second part P2 so as to occupy at least each of the respective portions in the curved region 10A at the first to third locations counted from the positive electrode end part 11T made it possible to more effectively suppress the precipitation of the lithium compound.

Although the present technology has been described herein with reference to one or more embodiments including Examples, the configuration of the present technology is not limited thereto, and is therefore modifiable in a variety of ways.

Specifically, the description has been given of the case where the secondary battery has a battery structure of the laminated-film type. However, the battery structure of the secondary battery is not particularly limited, and may have another battery structure such as a battery structure of a prismatic type. Accordingly, a kind of the outer package member is not particularly limited, and a film having flexibility may be used, or a metallic can having rigidity may be used.

Further, although the description has been given of the case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited to those described herein. Accordingly, the present technology may achieve any other effect.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising a battery device in which a positive electrode and a negative electrode are stacked on each other with a separator interposed between the positive electrode and the negative electrode and a stack of the positive electrode, the negative electrode, and the separator is wound about a winding axis, a section of the battery device having an elongated shape defined by a major axis and a minor axis, the section intersecting the winding axis, wherein the battery device includes a flat region and a curved region, the flat region extending in a direction of the major axis, the curved region being coupled to the flat region and being curved, the positive electrode includes a positive electrode current collector and a positive electrode active material layer, the positive electrode active material layer being provided on the positive electrode current collector, the negative electrode includes a negative electrode current collector and a negative electrode active material layer, the negative electrode active material layer being provided on the negative electrode current collector and opposed to the positive electrode active material layer, at least the positive electrode active material layer in an innermost wind of the positive electrode of the battery device includes a first part and a second part, the first part including a positive electrode active material having a first area density, the second part including a positive electrode active material having a second area density that is lower than the first area density, and the second part is provided at least on both a whole of the positive electrode active material layer in the innermost wind in the curved region and the positive electrode active material layer in the innermost wind in a portion, of the flat region, that is in a vicinity of a border between the flat region and the curved region.

2. The secondary battery according to claim 1, wherein the second area density is greater than or equal to 70 percent and less than or equal to 95 percent of the first area density.

3. The secondary battery according to claim 1, wherein, in the positive electrode active material layer, respective portions of the positive electrode active material layer provided in the curved region at first to third locations counted from an end part on an inner side of winding of the battery device each serve as the second part.

4. The secondary battery according to claim 1, wherein the positive electrode active material layer in the innermost wind is located on an outer side of winding relative to the negative electrode active material layer in an innermost wind of the negative electrode of the battery device.

5. The secondary battery according to claim 1, wherein the positive electrode active material layer in the innermost wind is provided on a surface on an inner side of winding of the positive electrode current collector.

6. The secondary battery according to claim 1, wherein the first part has a first thickness, and the second part has a second thickness that is smaller than the first thickness.

7. The secondary battery according to claim 6, wherein the second thickness is greater than or equal to 70 percent and less than or equal to 95 percent of the first thickness.

8. The secondary battery according to claim 1, wherein a utilization rate of the negative electrode when the secondary battery is charged at a battery voltage of 4.4 volts is greater than or equal to 90 percent and less than or equal to 100 percent.

* * * * *